July 27, 1965 A. D. VENTRELLA 3,196,472
MOBILE WASHING APPARATUS FOR AUTOMOBILES AND THE LIKE
Filed Feb. 12, 1964 3 Sheets-Sheet 1
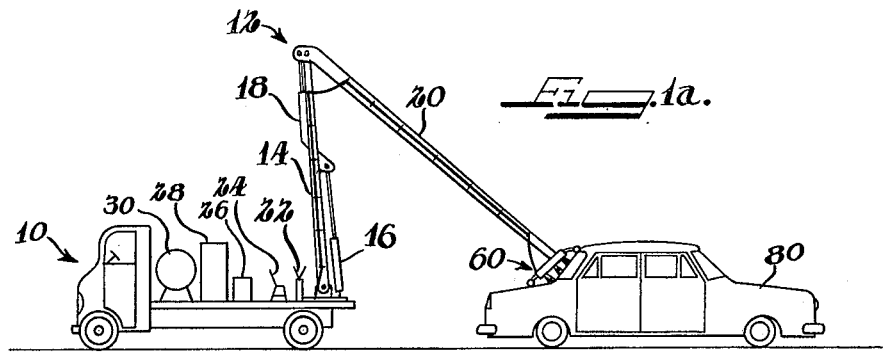
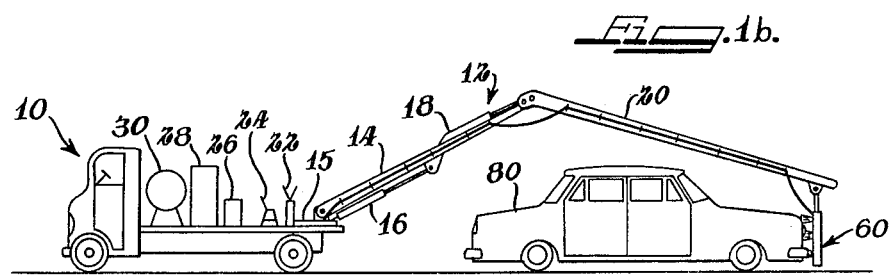
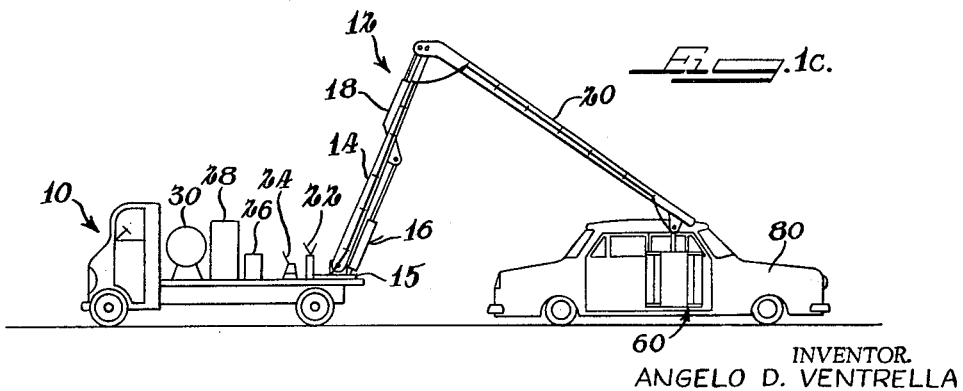
INVENTOR.
ANGELO D. VENTRELLA
BY
Greist, Lockwood, Greenawalt & Dewey
Attys.

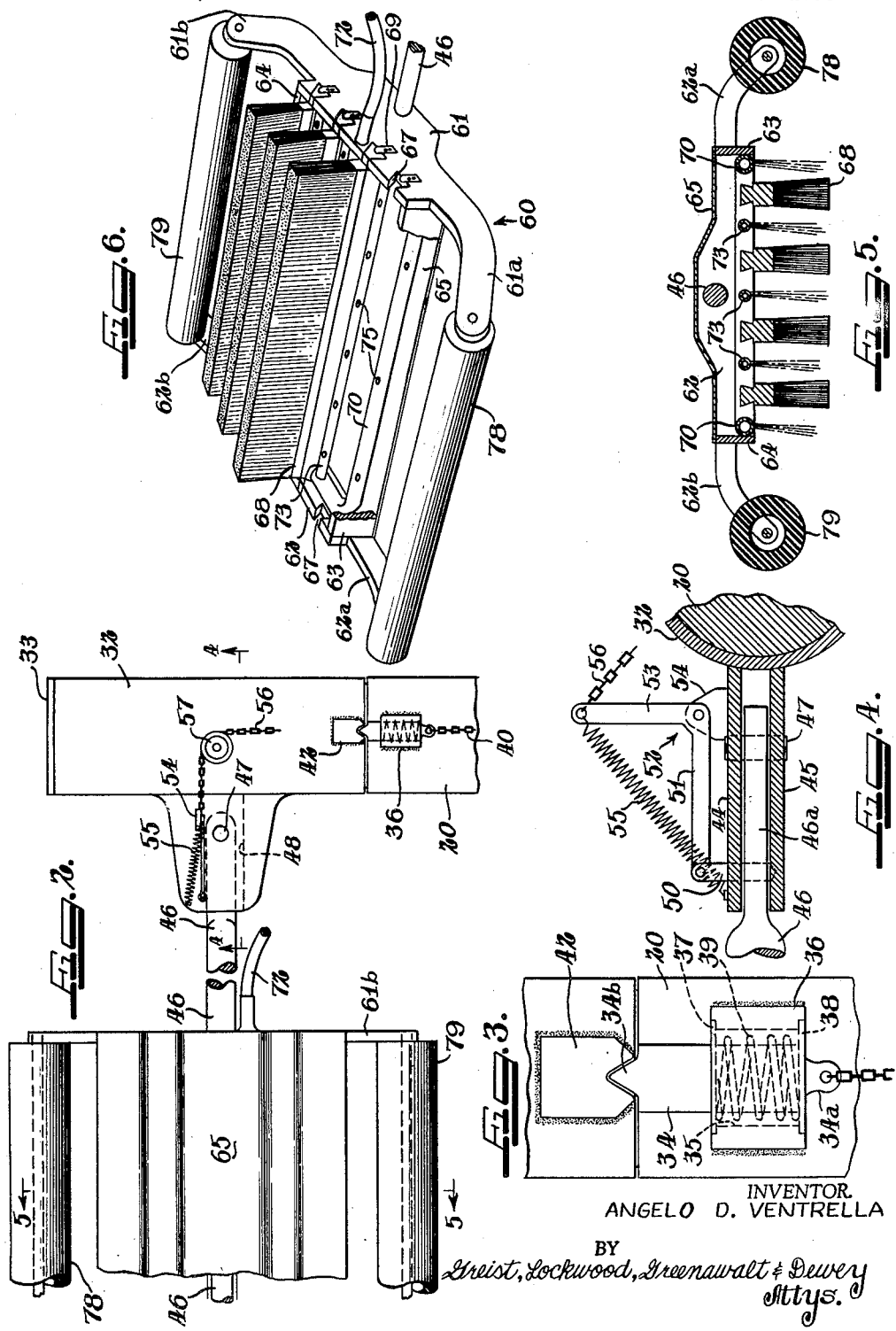

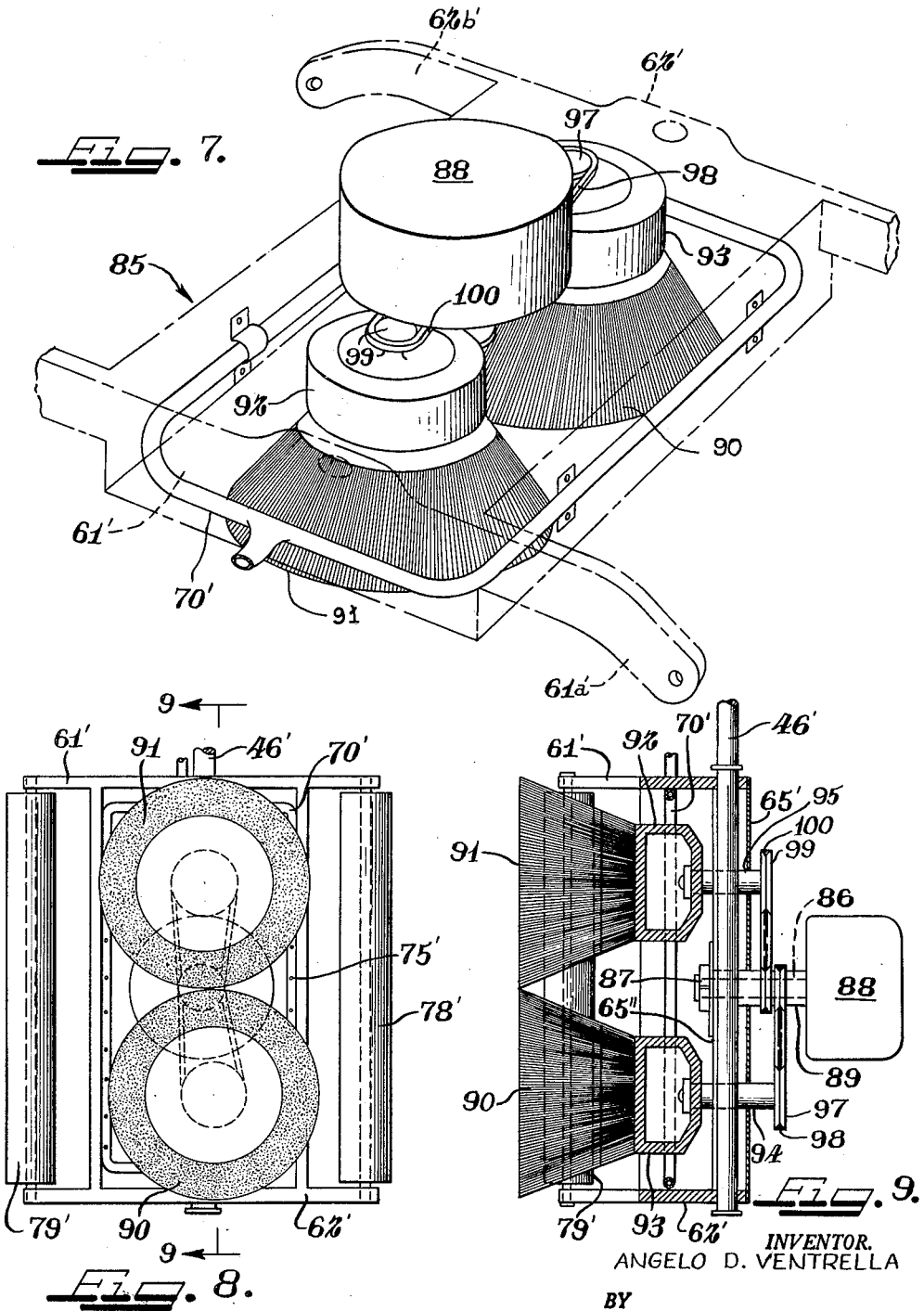

United States Patent Office 3,196,472
Patented July 27, 1965

3,196,472
MOBILE WASHING APPARATUS FOR
AUTOMOBILES AND THE LIKE
Angelo D. Ventrella, 5109 Carol Ave., Skokie, Ill.
Filed Feb. 12, 1964, Ser. No. 344,274
9 Claims. (Cl. 15—21)

This invention relates in a general way to washing apparatus, and more particularly to a new and improved mobile washing apparatus for washing automobiles or the like while the latter remain stationary.

As of the present time, automobiles are usually washed either by hand as at a home or service station, or by means of so-called minute automobile car washing installations which include a tunnel-like building housing in series a number of different washing machines and an endless conveyor for pulling automobiles through the building for being washed by various washing machines. Hand washing of automobiles is of course rather slow and time consuming, and therefore automobile washing in this manner is not suited for economically washing automobiles on a production or volume basis. The so-called automatic car washing installations mentioned above received limited success in recent years. The rather limited success of these washing installations is believed to be caused by at least two factors, viz. these automatic installations require considerable space which can be very expensive depending on their locations, and these devices require a number of rather elaborate washing machines or devices the cost of which is considerable. Accordingly, with the use of these automatic car washing installations a great number of automobiles must be washed before a break-even point is even reached.

The design of the apparatus of the present invention was prompted by a concept which is entirely new and different from the concepts involved in the automobile washing operations described above. This invention is concerned with a washing apparatus that can be brought to and operated in an area where a great number of cars are assembled. More specifically, the present invention relates to a self-contained, and preferably self-propelled, automobile washing apparatus which can be moved from place to place for washing automobiles while they are stationary. The present invention is primarily although not exclusively intended for use in large parking lots adjacent shopping centers, factories, amusement parks, etc.

Accordingly, it is a primary object of the present invention to provide a new and improved mobile washing apparatus which includes means for effectively and quickly washing an automobile or the like while the latter is stationary.

It is a further object of the present invention to provide a new and improved washing apparatus of the type described which includes a novel boom supported washing device for effectively washing the surfaces of an automobile body.

Another object of the present invention is the provision of a washing apparatus of the type described which permits a single operator to wash substantially all of the exterior of an automobile in a rapid and expeditious manner.

Still another object of the present invention is the provision of a washing apparatus of the type described which can be readily moved from place to place.

A still further object of the present invention is the provision of a mobile washing apparatus of the type described which is easy and inexpensive to construct and which is very durable in use.

These and other objects and advantages of the invention will become apparent from the following specification describing a preferred embodiment of the invention which is illustrated in the accompanying drawings.

In the drawings:

FIGS. 1a, 1b and 1c are side elevational views, largely schematic, of the mobile washing apparatus of this invention showing the same washing respectively the upper surfaces, front, and side of an automobile;

FIG. 2 is an enlarged, fragmentary top plan view of the end of a boom and washing device forming a part of the present invention;

FIG. 3 is an enlarged top plan view of locking means for a sleeve member rotatably mounted on the end of the boom;

FIG. 4 is a section taken along line 4—4 of FIG. 2;

FIG. 5 is a section taken along line 5—5 of FIG. 2;

FIG. 6 is a perspective view of one form of the washing device of this invention with certain parts of the same being broken away for better illustration of the invention;

FIG. 7 is a perspective view of another form of washing device with certain parts being broken away or shown in phantom lines;

FIG. 8 is an elevation of the washing device of FIG. 7 as seen looking toward the washing face or surface thereof; and FIG. 9 is a vertical section taken along line 9—9 of FIG. 8.

Now referring to FIGS. 1a–1c, a mobile base in the form of a flat bed-type truck 10 has an articulated boom 12 mounted thereon. Boom 12 includes a first portion 14 pivotally mounted on a base 15 for swinging movement in a vertical plane. Base 15 is rotatably mounted on the bed of truck 10 thereby adapting boom 12 for swinging movement about a vertical axis defined by the axis of rotation of base 15. Suitable means (not shown) preferably of the hydraulic type, are connected with base 15 for rotating the latter. A hydraulic ram 16 has one end thereof pivotally secured to base 15 and the other end thereof pivotally secured to boom section 14 at approximately the midpoint of the latter. Actuation of hydraulic ram 16 causes swinging movement of the boom in a vertical plane. A hydraulic ram 18 has one end thereof pivotally secured to boom section 14 and the other end thereof pivotally secured to one end of a boom section 20, which section is pivotally secured to the outer end of boom section 14. Actuation of hydraulic ram 18 causes swinging movement of boom section 20 relative to section 14 and in a vertical plane.

Articulated boom 12, often referred to as a "snorkel" type boom, may be of any known type. Hydraulic rams 16 and 18 and the means for rotating the base 15 are operated from a control panel 22 which is mounted on the bed of the truck 10 just rearwardly of an operator's chair or seat 24. The bed of truck 10 also supports a suitable hydraulic reservoir and pump unit 26 for operation of the various hydraulic devices which in turn operate boom 12. The bed of truck 10 also supports a rather large water tank 30 operatively associated with a boiler unit 28 for supplying hot water or steam to the washing device carried by boom 12 as will be explained hereinbelow.

Referring now to FIG. 2, it will be understood that boom section 20 has a reduced in diameter end portion rotatably mounting a sleeve 32. A cap 33 is secured to the end of boom section 20 for preventing separation of sleeve 32 from the latter. Means are provided for fixing sleeve 32 in one rotary position with respect to the boom. These means include a plunger 34 having one end thereof received in a bore 35 (FIG. 3) formed in a block 36 secured to boom section 20. Plates 37, 38 close respective ends of bore 35, which plates have openings slidably receiving plunger 34. A coil spring 39 encircles plunger 34 in bore 35, which spring has one end thereof abutting plate 38 and the other end thereof suitably secured to plunger 34 for yieldably urging the latter to the position illustrated in FIG. 3. One end of plunger 34 includes an integral eye 34a which is connected to a chain 40. Chain 40 is trained through suitable pulleys or rollers fastened to boom 12; chain 40 extends to the operator's control console 22.

As best seen in FIG. 3, plunger 34 has a V-shaped tip 34b adapted to be received in a complementary shaped recess formed in a block 42, which block is fixedly secured to sleeve 32. It should be apparent that withdrawal of plunger 34 by pulling chain 40 from the operator's console permits sleeve 32 to rotate freely on the end of boom section 20.

As seen in FIGS. 2 and 4, sleeve 32 has a pair of integral, parallel, spaced ears 44 and 45. A circular in cross-section arm 46 has a flattened end portion 46a pivotally mounted between ears 44, 45 by a pin 47, which pin is received in suitable aligned bores in the ears and flattened end portion of the arm. As noted in FIG. 2, ears 44, 45 include an integral web portion 48 which extends between the ears at a right angle from sleeve 32. This web portion abuts one side of flattened end portion 46a for preventing swinging movement of arm 46 beyond an approximately 90° position with respect to the longitudinal center line 32. Arm 46 is free to swing in a clockwise direction (FIG. 2) until it abuts the side of sleeve 32.

A pin 50 is slidably received in a through bore in ear 44 and in a blind bore in ear 45. When pin 50 is received in these bores in ears 44, 45 it abuts one side of flattened arm portion 46a for cooperating with web 48 thereby to secure arm 46 in a substantially right angle position approximating the position illustrated in FIG. 2. It should be noted at this time that when sleeve 32 is fixed to boom section 20 by plunger 34, arm 46 is supported in a horizontal position.

Pin 50 has one end thereof pivotally secured to an arm 51 of a bell crank member 52, which member has a second arm 53 coplanar with arm 51 and extending at a right angle to the latter. Bell crank 52 is pivotally mounted at the juncture of the arm portions thereof to a lug 54 secured to ear 44. A spring 55 has one end thereof secured by suitable means to the upper surface of arm 44 and the other end thereof secured in an opening in the free end of arm 53 of the bell crank. A chain 56 has one end thereof secured to the free end of arm 53, and chain 56 is trained around a pulley 57 (FIG. 2) rotatably supported on sleeve 32. Chain 56 is trained over suitable rollers or pulleys fastened on boom 12, and the chain extends to control console 22 for being pulled by an operator of the washing apparatus. It will be realized that by pulling chain 56, pin 50 is thereby withdrawn for permitting arm 46 to swing in a clockwise direction (FIG. 2) between ears 44. Suitable stop means (not shown) are provided to prevent withdrawal of pin 50 to such an extent that the latter is removed from its aperture in ear 44.

A unique washing device or head is swingably mounted on the free end of arm 46. As best seen in FIGS. 2, 5 and 6, this washing device or head, generally designated 60, includes a rectangular frame member consisting of end plates 61, 62 and side plates 63, 64. It will be understood that these four plates are suitably secured together to form a rigid structure. A rectangular plate 65 encloses one face of the box-like structure formed by plates 61–64. End plates 61, 62 include aligned openings in which arm 46 is rotatably received. Suitable means (not shown) are provided on the end of arm 46 for preventing separation of washing head 60 from arm 46 but for allowing free swinging movement of the washing device on the arm. End plates 61 and 62 include a plurality of aligned dovetail notches 67 adapted to receive complementary shaped opposite ends of respective brush units 68. Small metal clips 69 secured to end plates 61, 62 adjacent the dovetail notches therein, engage opposite ends of the brush units for preventing longitudinal movement of the latter with respect to the end plates of the washing device. These clips need only be bent or swung to one side to permit removal of the brush units for replacement purposes, for example. As will be apparent from FIGS. 5 and 6, brush units 68 are secured to the washing device in parallel spaced relation. Further, brushes 68 extend in parallel relation with the axis of rotation of washing device 60 defined by arm 46.

A continuous, generally rectangular shaped tube 70 is suitably secured to and extends along inside surfaces of plates 61–64. Tube 70 is joined by suitable conduit means (not shown) to one end of a flexible hose 72. This flexible hose is carried by boom 12 and communicates with suitable conduits (not shown) which are connected to water tank 30 through a suitable control valve on operator's console 22. A tubing section 73 extends along each of the spaces defined between brush units 68, which tubing has opposite ends thereof communicating with continuous tubing section 70. Tubing section 70 and tubing sections 73 include a plurality of spaced openings or perforations 75 for directing a cleaning fluid, such as water, in a plurality of jets or streams on opposite sides of each of brush units 68 as seen in FIG. 5.

End plate 61 includes integral leg portions 61a and 61b at opposite ends thereof. In like manner, end plate 62 includes integral leg portions 62a and 63a at its opposite ends. Leg portions 61a and 62a include aligned openings for rotatably receiving opposite ends of a guide roller 78. Similarly, the ends of leg portions 61b and 62b include aligned openings rotatably receiving opposite ends of a second guide roller 79. As will become apparent, these guide rollers cause cleaning head 60 to follow the contours of a surface to be washed.

As mentioned above, the framework of washing device 60 is of rigid construction. However, rollers 78, 79 are preferably made of resilient material so as to conform to some degree to the surfaces of irregular shaped objects, such as the body of an automobile. Brush units 68 include bristles which are rather soft and flexible so as to readily conform to irregular contours, such as the surface of an automobile body.

The operation of the self-propelled, self-contained automobile washing apparatus of this invention is as follows:

Truck 10 is driven to an area in which automobiles are to be washed. For example, truck 10 may be driven to an area in or adjacent a shopping center, parking lot or factory parking lot. A number of cars to be washed may be parked in suitably spaced relation in this area for convenient washing by the apparatus of this invention. Under some conditions, it may not be necessary to move an automobile from its regular parked location if there is adequate room in the vicinity for maneuvering truck 10 and manipulating boom 12. However, normally the automobiles to be washed are parked in appropriate spaced relation so as to allow maneuvering of the truck and manipulation of the boom. Of course, truck 10 itself may be parked and the automobiles to be cleaned brought one at a time just rearwardly of the truck for being washed by the washing device secured to boom 12. Let it be assumed that truck 10 is positioned with respect to an automobile 80 in the relationship illustrated in FIGS. 1a–1c.

Preferably, a supply of hot water is furnished to the washing device to minimize the drying operation, although of course cold water may be used. Also, a cleaning agent, such as a detergent, may or may not be used in the washing device. Boiler 28 is started so as to heat a supply of water in tank 30 to be supplied to washing head 60 through conduit 72. Prior to the start of a washing operation, plunger 34 is engaged with block 42 on sleeve 32 thereby fixing or locking the latter to the end of boom 20. As mentioned above, the plunger and block 42 are so located on boom section 20 and sleeve 32 respectively so that when the plunger engages the recess in block 42 ears 44, 45 support arm 46 in a generally horizontal position. Further, it will be understood that prior to a washing operation, pin 50 is received in its bores in ears 44, 45 so as to engage one edge of flattened arm portion 46 and cooperate with web 48 for holding arm 46 at a generally right angle position with respect to sleeve 32. With arm 46 fixed to boom section 20 in the manner just described, washing device 60 is supported in a generally horizontal position wtih the brushes and perforations thereof extending downwardly. Accordingly, when a supply of water is forced through the perforations of washing device 60 by opening the appropriate control valve on operator's console 22, the upper surfaces of an automobile may be washed by operating or controlling the various hydraulic rams associated with articulated boom 12 (FIG. 1a). Guide rollers 78, 79 of washing device 60 cause the latter to follow the contours of the automobile body.

After the upper surfaces of the automobile have been washed, the operator of the device pulls chain 40 which retracts plunger 34 thereby allowing sleeve 32 to rotate freely on the end of boom section 20. After this has been done, the operator lifts boom section 20 to allow arm 46 and the washing device carried thereby to swing downwardly in a vertical plane. Next, the operator pulls chain 56 for withdrawing pin 50 thereby allowing arm 46 to assume a vertical position (FIGS. 1b, 1c). Now, articulated boom 12 is operated by means of the various hydraulic rams for causing the washing device to pass over the front, rear and sides of the automobile thereby completing the washing operation.

After a washing operation has been completed by means of washing device 60, the operator or an assistant manually rotates sleeve 32 so that the same is again locked to boom section 20 by means of plunger 34. Arm 46 is manually returned to its approximate right angle position with respect to sleeve 32 and pin 50 is returned in the opening in the ear so as to cooperate with web 48 again to lock arm 46 in its approximate right angle position with respect to sleeve 32. After sleeve 32 and arm 46 have been locked in the manner just described, another washing operation may be commenced with washing device 60.

Washing device 60 is effective to wash the entire surface of an automobile wtih the exception of the wheels. Suitable means (not shown), such as a nozzle fastened on a hose extending from the water supply carried by truck 10 may be provided for washing the wheels of the automobile.

After the automobile has been washed, the same may be dried by means of a towel or chamois. However, if the water temperature is maintained between 205° to 220° F. by means of boiler 28, little if any drying is required because of rapid evaporation of the water at this temperature.

A further embodiment of the washing head or device is illustrated in FIGS. 7, 8 and 9. The parts of the modified washing device, generally designated 85, which correspond to the parts of washing device 60 are indicated by the prime form of numeral.

Referring now to FIGS. 7–9, in which modified washing device 85 is somewhat diagrammatically illustrated, an auxiliary plate 65″ parallel and spaced from back plate 65′ fixedly supports one end of a rod 86 as by means of a suitable fastener 87. Rod 86 supports an electric motor 88 at the free end thereof. A sleeve 89 is rotatably supported on rod 86 and extends freely through an opening in plate 65′. Sleeve 89 is driven by electric motor 88.

A pair of circular brushes 90 and 91 have heads 92, 93 secured to ends of respective shafts 94, 95. Shafts 94, 95 are journaled by suitable means (not shown) in openings in plates 65′ and 65″ forming a part of the structural framework of the washing device. Shaft 94 supports a wheel 97 over which is trained a belt 98, which belt is also trained over shaft 89. In like manner, shaft 95 supports a wheel 99 having a belt 100 trained over the wheel and also around shaft 89. It should be apparent that operation of electric motor 88 causes simultaneous rotation of brushes 90, 91 in the same rotary direction. As noted in FIGS. 7 and 8, brushes 90 and 91 are slightly off-set laterally of the washing device to cover a greater surface area when the washing device is moved in a direction longitudinally of the latter, i.e. parallel with the axis of arm 46.

The operation of the washing apparatus of this invention is substantially the same when using washing device 85 in lieu of washing device 60. However, washing device 85 is effective to wash a surface when supported in stationary contact with the same by reason of the rotation of brushes 90, 91. It will be understood that when washing device 85 is employed, operation of electric motor 88 is controlled from operator's console 22 on the bed of truck 10.

While the invention has been shown in but one form, it will be apparent to those skilled in the art that it is not to be so limited. On the contrary the invention is susceptible of various modifications and changes without departing from the spirit and scope of the appended claims. Also, the washing apparatus of this invention is not to be limited to washing only automobiles. For example, the apparatus can be used to wash truck trailers, bus coaches, aircraft, boats, building exteriors, etc.

I claim:

1. An apparatus for washing automobiles and the like comprising, a mobile base, an articulated boom swingably mounted on said base, a washing device mounted on said boom by first and second releasable means, which means are controlled from said base, said first means being mounted on said boom and being movable relative thereto and said second means being mounted on said first means and being movable relative thereto, said first and second means being adapted to support said washing device in a generally horizontal position for washing the upper surfaces of an automobile, and said first and second means, when released being adapted to support said washing device in a generally vertical position for washing the front, rear and sides of an automobile.

2. An apparatus for washing automobiles and the like comprising, a mobile base, an articulated boom swingably mounted on said base, a washing device mounted on said boom by means including first and second releasable members each being controllable from said base, said means being adapted to support said washing device in a generally horizontal position for washing the upper surfaces of an automobile, and said means being adapted to support said washing device in a generally vertical position, when said first and second members are released, for washing the front, rear and sides of an automobile.

3. An apparatus for washing automobiles and the like comprising, a mobile base, an articulated boom swingably mounted on said base, an arm mounted on said boom by first and second releasable means, a washing device swingably mounted on said arm, which washing device has a washing face generally parallel with said arm, said first and second releasable means being adapted to support said arm in a generally horizontal position for washing the upper surfaces of an automobile by said washing device, said first means, when released, being adapted to allow said arm to swing to a position in a vertical plane and said second means, when released after release of said first means, being adapted to allow said arm to swing to a vertical position for washing the front, rear and sides of an automobile by said washing device.

4. An apparatus for washing automobiles and the like comprising, a mobile base, an articulated boom swingably mounted on said base, a sleeve rotatably mounted on the free end of said boom and fixed in one rotary position by first releasable means controllable from said base, an arm mounted to said sleeve for swinging movement in a plane fixed with respect to said sleeve and containing a longitudinal centerline thereof, second releasable means on said sleeve and controllable from said base for holding said arm in a position at a generally right angle to said longitudinal centerline, a washing device swingably mounted on said arm, which washing device has a washing face generally parallel and symmetrical with said arm, said first and second releasable means, when not released, being adapted to support said arm in a generally horizontal position for washing the upper surfaces of an automobile by said washing device, said first means, when released, being adapted to allow said arm to swing to a position in vertical plane and said second means, when released after release of said first means, being adapted to allow said arm to swing to a vertical position for washing the front, rear and sides of an automobile by said washing device.

5. An apparatus for washing automobiles and the like comprising, a mobile base, an articulated boom swingably mounted on said base, a sleeve rotatably mounted on the free end of said boom, which sleeve includes a pair of integral spaced ears each being apertured for defining a pivot axis perpendicular to the longitudinal centerline of said sleeve and spaced therefrom, releasable means on said boom fixing said sleeve in a rotary position so that said pivot axis is generally vertically disposed, an arm swingably mounted between said ears by a first pin received in the apertures in the ears, stop means associated with said ears and adapted to engage said arm for preventing swinging movement of the latter toward said boom, a second pin received in openings in said ears and engageable with said arm for cooperating with said stop means to support said arm at a generally right angle with respect to the longitudinal centerline of said sleeve, control means connected with said second pin for withdrawing the latter to permit swinging movement of said arm, a washing device swingably mounted on said arm, which washing device has a washing face generally parallel and symmetrical with said arm, whereby prior to release of said releasable means and withdrawal of said second pin said arm is supported in a generally horizontal position thereby to support said washing device for washing upper surfaces of an automobile, and whereby after release of said releasable means and withdrawal of said second pin said arm is supported in a generally vertical position thereby to support said washing device for washing the front, rear and sides of an automobile.

6. The apparatus according to claim 5 wherein said washing device includes a frame supporting alternating rows of brushes and perforated tubing, and guide rollers carried by the frame thereby to cause the washing device to follow the contours of an automobile body.

7. The apparatus according to claim 5 wherein said washing device includes a frame supporting at least one rotary brush and motor means for rotating the same, washing fluid outlet means carried by said frame, and guide rollers on the frame thereby to cause the washing device to follow the contours of an automobile body.

8. A washing device comprising, a shaft and a generally rectangular frame having aligned openings along its longitudinal centerline, which openings rotatably receive said shaft thereby to swingably support said frame about the longitudinal centerline thereof, a plurality of alternating rows of brushes and perforated tubing extending lengthwise of the frame, said rows of tubing being connected with a common tubing which is adapted to be joined with a conduit, a guide roller mounted on each side of the frame in parallel relation with said centerline thereby to cause the washing device to follow the contours of a surface.

9. A washing device comprising, a generally rectangular frame having an open face, which frame includes pivot means adapting the frame to be swingably supported about a lengthwise centerline thereof, a circular brush mounted in said frame for rotation about an axis perpendicular to a plane containing said face, a motor carried by said frame and connected with said brush for rotating the same, washing fluid outlet means mounted in said frame, which fluid outlet means include a continuous perforated tubing extending around marginal portions of said frame for directing a flow of cleaning fluid outwardly of said face, which tubing is adapted to be connected to a fluid conduit, and a guide roller mounted on each side of said frame in parallel relation with said centerline thereby to cause the washing device to follow the contours of a surface to be washed.

References Cited by the Examiner
UNITED STATES PATENTS

| | | | |
|---|---|---|---|
| 1,901,647 | 3/33 | Howald et al. | 15—21.0 |
| 2,238,757 | 4/41 | Stevason | 15—98 |
| 2,559,295 | 7/51 | Grossenbacher | 15—98 |
| 2,612,648 | 10/52 | Lagant | 15—50 |
| 2,731,659 | 1/56 | Coplen | 15—50 X |
| 3,099,852 | 8/63 | Grant | 15—21 X |
| 3,104,406 | 9/63 | Rhodes | 15—21 |

CHARLES A. WILLMUTH, *Primary Examiner.*